Nov. 10, 1970  H. G. SWANSON  3,539,874
MOUNTING ARRANGEMENT FOR CIRCUIT BOARDS IN
INDICATING INSTRUMENTS
Filed Jan. 2, 1968  2 Sheets-Sheet 1
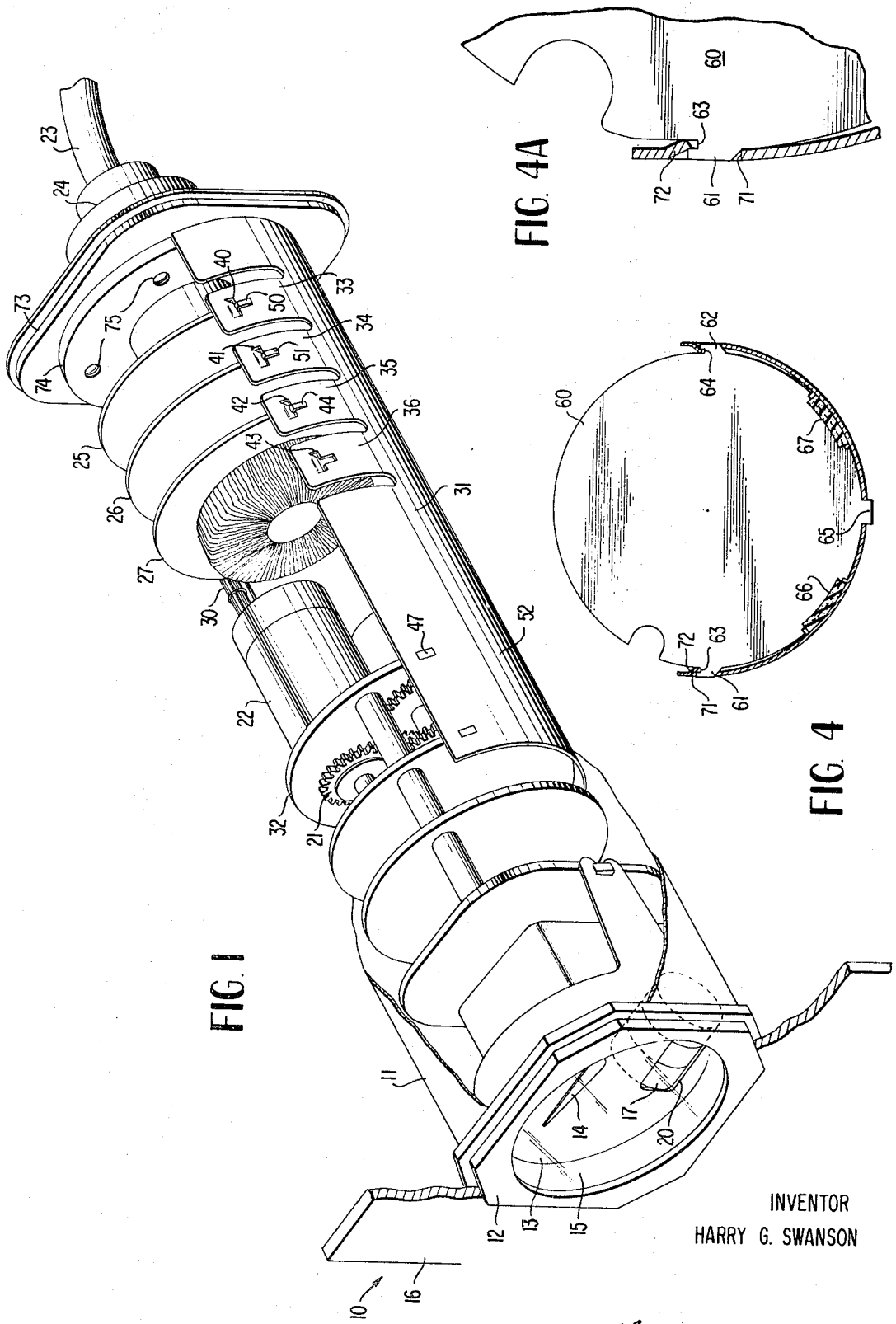
INVENTOR
HARRY G. SWANSON
BY *George A. Herbster*
ATTORNEY Nov. 10, 1970  H. G. SWANSON  3,539,874
MOUNTING ARRANGEMENT FOR CIRCUIT BOARDS IN
INDICATING INSTRUMENTS
Filed Jan. 2, 1968  2 Sheets-Sheet 2
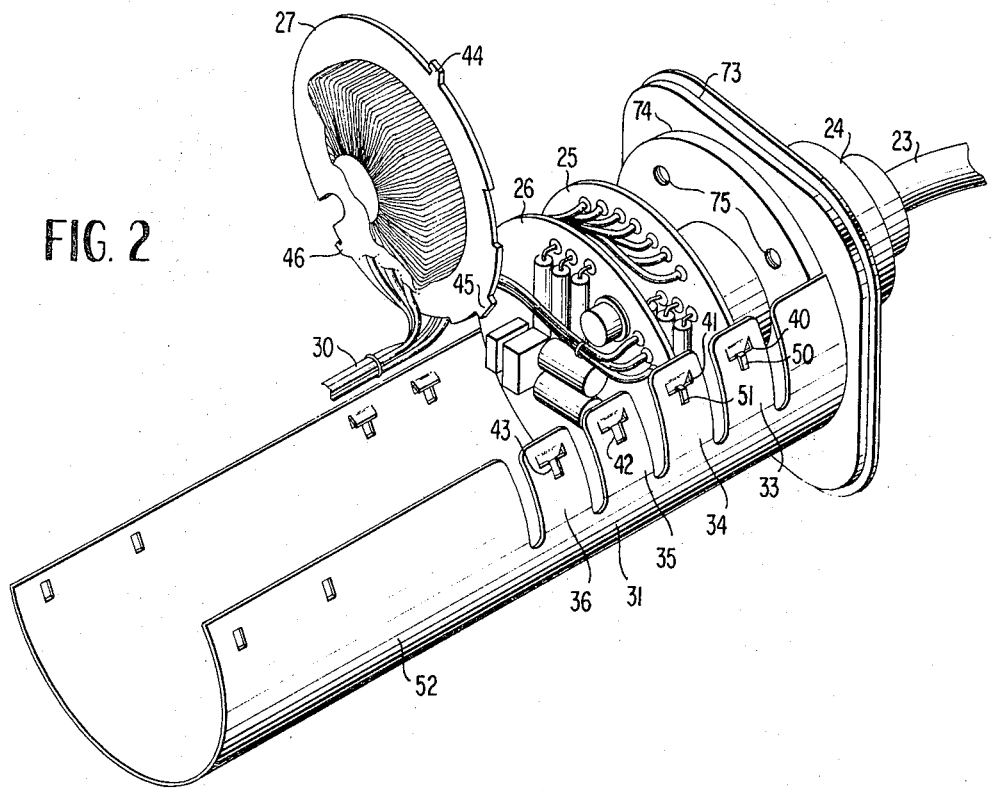
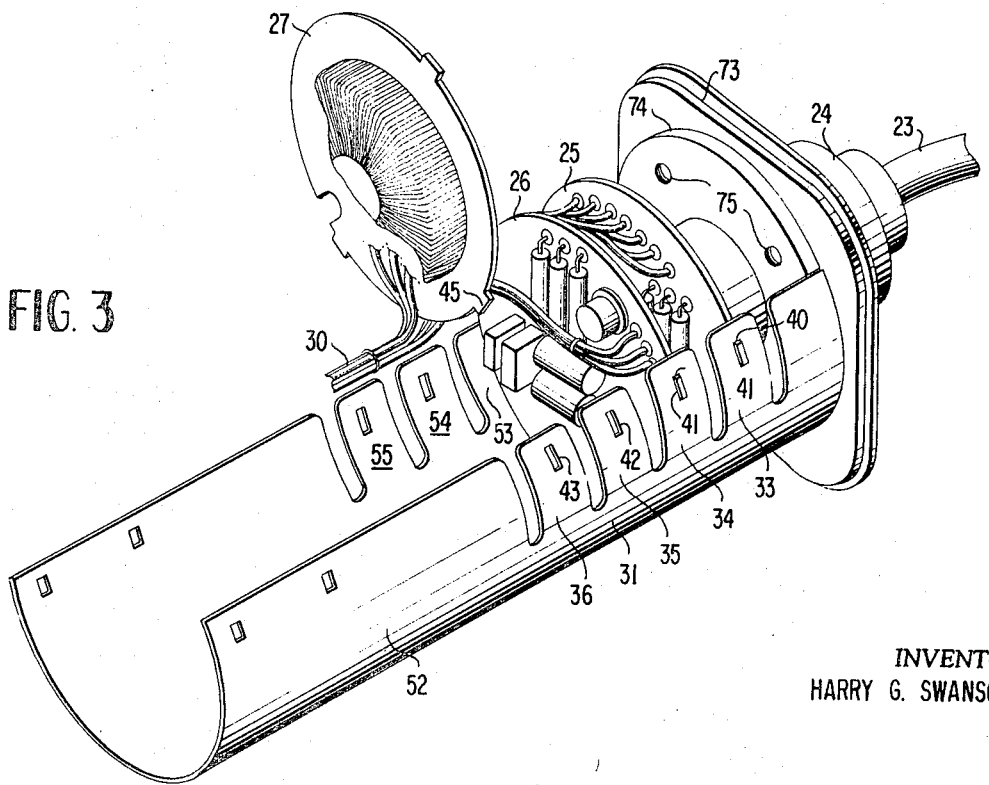
INVENTOR
HARRY G. SWANSON
BY *George A. Herbster*
ATTORNEY United States Patent Office 3,539,874
Patented Nov. 10, 1970

3,539,874
MOUNTING ARRANGEMENT FOR CIRCUIT
BOARDS IN INDICATING INSTRUMENTS
Harry G. Swanson, Tewksbury, Mass., assignor to General Electric Company, a corporation of New York
Filed Jan. 2, 1968, Ser. No. 695,105
Int. Cl. H02b 1/02
U.S. Cl. 317—101                                   13 Claims

ABSTRACT OF THE DISCLOSURE

A cradle for mounting planar electrical and mechanical supporting members in an instrument. A longitudinally extending, stiffly resilient member partially peripherally encompasses all the supporting members. Apertures adjacent the peripheral cradle terminations are arranged in pairs to engage and dispose the supporting members in a parallel orientation. At least one cradle portion terminates with spaced, deflectable portions adapted to individually release the support members.

BACKGROUND OF THE INVENTION

This invention relates to indicating instruments and more particularly to a means for mounting components within the indicating instrument.

Certain indicating instruments, especially those adapted for aircraft, include a visible scale plate, pointer and counter readout. In many systems, the pointer and counter readout driving mechanism is located rearwardly of the scale plate to form a self-contained system. Usually such a system includes electronic circuitry adapted to be connected to a sensor cable by means of an input connector. This circuitry converts the sensor signals to electrical output signals through electromechanical conversion means, such as servo systems, to thereby drive the pointer and counter readout.

Prior art systems have incorporated multifarious components in specially designed arrangements to mount such a system. To maintain such an indicating instrument, a large inventory was required. As is known, whenever a large inventory is required to support the operation of any device, the reliability of the device is decreased. Not only was the reliability of the prior art indicating instruments decreased, the associated complicated components testing and removal procedures increased maintenance time and costs.

It is an object of this invention to provide electronic circuitry mounting means in such an indicating instrument to increase the reliability of the indicating instrument.

Another object of this invention is to provide an indicating instrument wherein normal maintenance time and costs are decreased.

Still another object of this invention is to provide an indicating instrument in which a commonality of parts is realized.

Yet another object of this invention is to provide an indicating instrument wherein component removal and replacement are facilitated.

SUMMARY

In accordance with one aspect of this invention, a cradle partially peripherally encompasses planar support members to mount them in a parallel relationship. Means at the opposite peripheral terminations of the cradle are adapted to engage each supporting member and certain of the means are deflectable to facilitate removal of a single support member.

This invention is pointed out with particularity in the appended claims. A more thorough understanding of the above and additional objects and advantages of this invention may be obtained by referring to the description of the illustrative embodiments in conjunction with the accompanying drawings.

BRIEF DESCRIPTION OF THE DRAWINGS

FIG. 1 is a perspective view of an indicating instrument which incorporates this invention;

FIG. 2 is a partial perspective view of the indicating instrument shown in FIG. 1 with one circuit board removed;

FIG. 3 is a partial perspective view of another embodiment of an indicating instrument utilizing this instrument; and FIGS. 4 and 4A are detailed views of a specific locking arrangement adapted for use in conjunction with this invention.

DESCRIPTION OF ILLUSTRATIVE EMBODIMENTS

Referring now to the figures where like numerals refer to like elements throughout, an instrument indicator generally designated by numeral 10 is shown in FIG. 1 with most of its housing 11 removed. Such an instrument generally includes a visible portion including a flange 12, a scale plate 13, an indicating pointer 14 and a transparent dial face 15 over the scale plate 13 and the indicating pointer 14. This assembly is mounted on the front surface of a panel 16. These elements constitute an indicating means which provides a reading when the pointer 14 is driven along the scale plate 13 in response to a driving electrical signal.

Means for providing the driving electrical signal are disposed behind the panel 16 within the housing 11. As means for driving a pointer 14 and particular circuitry and mechanical elements for such a system are well known in the art, they are only shown in outline. The pointer 14 and a counter 17, disposed behind the panel 15 and visible through an aperture 20 in the scale plate 13, are driven through a gear mechanism 21 by a servomotor 22. The servomotor 22 is driven in response to sensor signals coupled to the indicating instrument 10 by means of a cable 23 which is attached to a connector assembly 24 and then coupled to an electronic circuit formed on a plurality of printed circuit boards 25, 26 and 27. Each circuit board is coupled to an adjacent board or to the connector assembly 23 by means of internal cables 30. Each of these printed circuit boards is maintained in a stacked, parallel, spaced relationship by an assembly constituted by a cradle 31 formed in accordance with this invention.

This particular structure of the cradle 31 may take several forms depending upon the particular application for which it is designed. To provide a complete understanding of this invention, two embodiments are discussed. In a first embodiment, shown in FIGS. 1 and 2, the printed circuit boards 25 through 27 and a first, of some number of supporting plates, 32, for the gear mechanism 21, the servomotor 22 and other mechanical parts, have a generally circular outline.

The cradle 31 is constituted by an integral semicircular metallic member which partially peripherally encompasses the supporting plate 32 and each of the circuit boards 25 through 27. At one peripheral termination, the cradle 31 comprises a plurality of spaced, apertured fingers 33 through 36, the apertures being designated by 40 through 43. These apertures are normally formed by integral punching to constitute means for engaging one of the circuit boards or plates. Similarly, each circuit board 25 through 27 and the plate 32 have a plurality of radially extending, circumferentially spaced tabs. For example, the circuit board 27, shown specifically in FIG. 2, includes tabs 44, 45 and 46. The tab 44 passes through the aperture 42 as shown in FIG. 1. Likewise similar tabs, such as tab 47 on the supporting plate 32, and tabs 50 and 51 on the printed circuit boards 25 and 26, are oriented to be engaged by the fingers 34 and 35 and an elongated cradle portion 52 which also may engage other supporting plates as shown in FIG. 1.

As specifically shown in FIG. 2, the third tab 46 on the circuit board 27 is substantially diametrically opposed to the first tab 44. The second tab 45 lies on an axis spaced from a common axis through the tabs 44 and 46. Integrally punched apertures formed in the cradle body 52 and fingers 33 through 36 are adapted to receive tabs, equivalent to the tabs 45, on the circuit boards 26 and 27 and the supporting plate 32. Likewise each of the printed circuit boards 25 and 26 and at least one of the supporting plates, such as the supporting plate 32, have tabs similar to the tab 47 formed thereon, and aligned apertures are formed in the cradle 31 to receive each tab. Therefore, plates represented by the plate 32 and each printed circuit board are maintained in a parallel orientation by the cradle 31.

In FIG. 2, only one peripheral termination of the cradle 31 is constituted by the spaced deflectable fingers. In the opposite direction, the cradle 31 is continuous and only interrupted by apertures formed in the cradle body. With this assembly any of the printed circuit boards may be easily removed to inspect, test, repair or replace it. For example, if the circuit board 27 required maintenance, it would merely be necessary to deflect the finger 35 away from the printed circuit board until the finger 35 cleared the tab 44. Certain locking arrangements are shown in FIGS. 1 and 2, but they will be explained hereinafter; it is assumed in this discussion that these locking means are disengaged. This permits the entire circuit board 27 to be pivoted back from the finger 35 and removed from the cradle 31. The internal cable 30 to the printed circuit board 27 is generally folded within the instrument to have sufficient length to permit complete physical removal of the printed circuit board without electrical disconnection. Hence, it is possible to obtain a closely stacked printed circuit board arrangement wherein access for testing and maintenance is facilitated.

The cradle embodiment shown in FIG. 3 includes a plurality of opposed spaced fingers at the opposite peripheral terminations. As specifically shown a second plurality of fingers, including visible fingers 53, 54 and 55, are diametrically opposed to the fingers 34, 35 and 36 respectively. Tabs 56 and 57 formed on the circuit board 27 serve the same function as tabs 44 and 46 in FIGS. 1 and 2 although they are generally rectangular. A tab similar to the tab 45 is also shown on the printed circuit board in FIG. 3 and, therefore, is designated by the same number. The structure of the tabs 56 and 57 is also adapted for use in FIGS. 1 and 2 especially where relatively small vibrations are involved. Normally in this approach, the unstressed diameter of the cradle 31 is slightly less than the diameter of the printed circuit boards 25, 26 and 27 and the supporting plate 32. Therefore, it is necessary to slightly deflect and stress the fingers when the printed circuit boards are in place. This deflection produces a clamping force which together with the engagement of the tabs and fingers secures the circuit boards in place. However, in a severely vibrating environment, the clamping force produced by this structure may be inadequate so that a printed circuit board or supporting plate could disengage from the cradle.

The embodiment of this invention shown in FIGS. 1, 2, 4 and 4A is adapted to be subjected to vibration and shock by the addition of a locking arrangement specifically shown in FIGS. 4 and 4A to the basic clamping arrangement. Referring to those figures, a printed circuit board generally represented by 60 has two diametrically opposed tabs 61 and 62. Each tab has a relieved portion formed between the tab and a main portion of the printed circuit boards 60. In this particular embodiment these relieved portions form notches 63 and 64. Formed on an axis perpendicular to the tabs 61 and 62 is a tab 65. Pads of resilient material 66 and 67 are interposed between a cradle 70 and circumferentially extending notches in the printed circuit board 60. These pads are generally affixed to the cradle 70 and oriented with respect to apertures therethrough so that the tabs 61, 62 and 65 and the pads 66 and 67 register with associated notches or apertures.

In accordance with this particular locking arrangement, apertures are formed at the peripheral terminations of the cradle 70 to receive the tabs 61 and 62. Material adjacent the upper edge of each aperture is punched inwardly to form an elongated tang; for example, in FIG. 4A the upper edge of the aperture 71 forms a tang 72. Each of the tangs is positioned so as to nest in one of the notches, such as the tang 72 in the notch 63. The aperture 71 and corresponding apertures in the cradle assembly are located so that it is necessary to compress the resilient pads 66 and 67 to permit the tabs 61 and 62 to pass through the apertures in the cradle. Upon release of this pressure the resilient pads 66 and 67 expand and force the circuit board 60 into the position shown in FIGS. 4 and 4A. In combination with the reduced, unstressed cradle diameter, positive locking of the printed circuit board 60 in the cradle occurs. Further, the addition of the locking means permits less expensive materials to be used because deformation caused by exceeding the elastic limits of the material can be overcome when the locking means is engaged. It will also be evident that other means can replace the resilient pads 66 and 67 to force the circuit board 60 into the locked position. Removal of the circuit board 60 is still facilitated, however, as it is merely necessary to apply pressure to the top of the board to again compress the pads 66 and 67 while deflecting one of the supporting fingers 33 through 36 outwardly to permit removal of the printed circuit board. While removal is facilitated, a positive locking action is provided by this arrangement so that the printed circuit boards are not unintentionally released during vibration.

Therefore, it can be seen that each embodiment described above serves to provide positive location and support for a plurality of printed circuit boards. The circuit boards and the particular instruments shown in FIGS. 1 and 2 are supported between the front plate 32 and the rear end plate of the instrument. As shown in FIGS. 1 and 1, an end plate 73 and, in this particular arrangement, an annular member 74 having a plurality of tapped apertures 75 formed therethrough are conventionally affixed to a rear portion of the cradle 31. The end plate 73 is affixed to the annular member 74 by conventional fastening means while the annular ring may be welded to the cradle 31.

In accordance with this invention, a bracket or cradle assembly for supporting and locating a plurality of plate members such as printed circuit boards or mechanical supporting plates in a stacked parallel relationship permits ready access to any individual plate for purposes of maintenance. Several embodiments of a cradle assembly have been shown, but it will be obvious to those of ordinary skill in the art that many modifications may be made to the specific embodiments shown. For example, the means on the cradle and the printed circuit boards or plates for providing interengagement and locking may be modified by eliminating the tangs if other parameters permit. Different arrangements may be provided for plates or circuit boards having different outlines. Therefore, it is the object of the appended claims to cover all such modifications and alterations which come within the true spirit and scope of the invention.

What is claimed as new and desired to be secured by Letters Patent of the United States is:

1. A cradle for a plurality of plates, each plate having first and second engaging means formed thereon, comprising an integral member adapted to partially peripherally encompass the plates, one peripheral terminating portion of said member having means adapted for engagement with the first plate engaging means, the opposite peripheral terminating portion having a plurality of means adapted for individual engagement with each of the second plate engaging means to orient the plates in a parallel relationship, said opposite peripheral terminating portion means being individually deflectable.

2. A cradle as recited in claim 1 wherein the first and second plate engaging means are constituted by protuberances, said means adapted for engaging the plates being formed by apertures in said peripheral terminating portions adapted to receive the plate protuberances.

3. A cradle as recited in claim 2 wherein said second peripheral terminating portion comprises a plurality of spaced, substantially peripherally extending fingers, each of said fingers being individually deflectable away from an associated plate to facilitate insertion and removal of the plate in and from said cradle.

4. A cradle as recited in claim 3, said first peripheral terminating portion comprising a continuous portion of said cradle interrupted only with a plurality of apertures aligned with corresponding ones of the apertures in said fingers.

5. A cradle as recited in claim 3, said first peripheral terminating portion comprising a second plurality of spaced fingers, each of said second plurality of fingers being aligned with one of said first plurality of fingers and including an aperture aligned with a corresponding one of the apertures of said first plurality of fingers.

6. A cradle as recited in claim 3 additionally comprising means for releasably locking each plate in said cradle.

7. In an indicating instrument including a support means, means mounted on the support means for indicating a condition, means for driving the indicating means in response to a driving signal mounted on said support means, and means including electronic components mounted on a plurality of circuit boards to be responsive to a measured parameter for generating the driving signal, each circuit board having a plurality of engaging means formed thereon, the improvement of a cradle for supporting the circuit boards in parallel and for mounting the circuit boards to the support means, said cradle comprising an integral member partially peripherally encompassing the circuit boards, said member having first and second peripheral terminating portions, said first peripheral terminating portion including means adapted for cooperating with certain of the plate engaging means and said second peripheral terminating portion including a plurality of spaced fingers having means adapted for cooperating with certain other of the plate engaging means to orient the circuit boards, and means for affixing said member to the support means.

8. An indicating instrument as recited in claim 7, wherein the circuit board engaging means are constituted by protuberances, each of said fingers having an aperture formed therethrough adapted to receive one of the circuit board protuberances to engage the circuit boards, each of said fingers being deflectable to individually release one of the circuit boards.

9. In an instrument for indicating a condition including support means, indicating means mounted to the support means, driving means mounted to the support means and connected to drive the indicating means in response to a driving signal, and electrical means responsive to the condition for generating the driving signal, the improvement of means for mounting the electrical means for the support means comprising:

(a) a plurality of circuit boards each having a plurality of tabs formed thereon for mounting the electrical means, (b) a cradle partially peripherally encompassing said circuit boards and having a first peripheral terminating portion including a first plurality of spaced apertures so said cradle engages one tab on each circuit board, a second peripheral terminating portion including a plurality of spaced fingers each having an aperture formed therethrough aligned with one of the first plurality of apertures so said cradle engages another tab on each circuit board to mount said circuit boards in a spaced, parallel relation and means for engaging the support means, and (c) conductor means for interconnecting the electrical means.

10. An instrument as recited in claim 9, said circuit board having a generally circular outline with a pair of said tabs extending radially therefrom in diametrically opposed directions, said cradle being formed of an integrally punched spring material and the apertures being punched in said material to be substantially diametrically opposed, each of said diametrically opposed circuit board tabs extending through one of said apertures, each circuit board additionally comprising a third tab spaced between said diametrically opposed tabs and said cradle having a third aperture located to register with said third tab.

11. An instrument as recited in claim 10 each of said circuit boards having a given radius, said cradle having an unstressed radius less than said given radius and said fingers being individually deflectable to facilitate removal of a circuit board.

12. An instrument as recited in claim 11 additionally comprising locking means for releasably locking each of said circuit boards in said cradle.

13. An instrument as recited in claim 11, each of said circuit boards having circumferentially extending notches formed therein adjacent said third tab, a plurality of resilient strips disposed longitudinally along said cradle to engage said circuit board at said notches, each of said diametrically opposed tabs having a notch formed therein on a side opposite from said third tab, said cradle having inwardly extending tangs formed thereon adjacent the apertures to engage respective notches in each circuit board, said resilient material strips forcing said circuit boards into engagement with said tangs.

References Cited

UNITED STATES PATENTS

| 2,796,559 | 6/1957 | Feucht. |
| 2,876,277 | 3/1959 | Badger et al. |
| 2,887,525 | 5/1959 | Lewus _____ 220—22 X |
| 3,420,973 | 1/1969 | Fischer et al. |

FOREIGN PATENTS

| 64,929 | 7/1955 | France. |

ROBERT K. SCHAEFER, Primary Examiner

DAVID SMITH, JR., Assistant Examiner

U.S. Cl. X.R.

174—52; 200—168; 211—41; 339—17; 340—27